(12) United States Patent
Tomita et al.

(10) Patent No.: US 7,107,865 B2
(45) Date of Patent: Sep. 19, 2006

(54) POWER TRANSMISSION APPARATUS FOR VEHICLE

(75) Inventors: Kazushi Tomita, Tokyo (JP); Kiyotaka Fukui, Aichi (JP)

(73) Assignee: Masashi Seimitsu Industry Co., Ltd., Aichi (JP)

( * ) Notice: Subject to any disclaimer, the term of this patent is extended or adjusted under 35 U.S.C. 154(b) by 195 days.

(21) Appl. No.: 10/941,821

(22) Filed: Sep. 16, 2004

(65) Prior Publication Data
US 2005/0056107 A1 Mar. 17, 2005

(30) Foreign Application Priority Data
Sep. 17, 2003 (JP) .............................. 2003-324968

(51) Int. Cl.
*F16C 3/00* (2006.01)
*F16H 3/08* (2006.01)
*F16H 33/00* (2006.01)

(52) U.S. Cl. .......................... 74/325; 74/640; 464/179
(58) Field of Classification Search ................ 74/325, 74/329–333, 640; 29/893.1, 893.2; 464/179
See application file for complete search history.

(56) References Cited
U.S. PATENT DOCUMENTS 5,649,456 A * 7/1997 Mochizuki ................ 74/606 R
5,966,998 A 10/1999 Hara et al.
6,658,953 B1 * 12/2003 Lee .............................. 74/339
6,929,097 B1 * 8/2005 Hedman ..................... 184/6.28

FOREIGN PATENT DOCUMENTS

JP 10-259860 9/1998

* cited by examiner

Primary Examiner—Tisha Lewis
(74) Attorney, Agent, or Firm—Smith, Gambrell & Russell, LLP

(57) ABSTRACT

The power transmission apparatus for a vehicle has a main shaft having drive gears mounted thereto and a countershaft having driven gears mounted thereto, and the respective shafts are attached to a case. A reverse shaft attached to the case has an idler gear for reverse operation or a reverse idler gear rotatably attached thereto which is engaged with a drive gear for reverse operation and a driven gear for reverse operation. The reverse shaft has a projection which is integrally formed thereon and is in contact with one side surface of the reverse idler gear, and has a washer mounted thereto which is in contact with the other side surface of the reverse idler gear.

2 Claims, 6 Drawing Sheets

POWER TRANSMISSION APPARATUS FOR VEHICLE

TECHNICAL FIELD OF THE INVENTION

The present invention relates to a power transmission apparatus for a vehicle that has a reverse shaft for supporting an idler gear for reverse operation or a reverse idler gear to move a vehicle backward.

BACKGROUND OF THE INVENTION

An ATV (All Terrain Vehicle) that runs on irregular grounds or all grounds, called a buggy, is a single-seat off-road vehicle having four wheels, which may be used in leisure such as hunting and trail touring or used as a farm vehicle in some cases. In such an all-ground type vehicle, as a transmission in a power transmission apparatus for transmitting power of an engine to drive wheels, manual type one is employed which performs shift operations by a driver's shift pedal operations.

The manual type transmission has a transmission input shaft or a main shaft that is coupled to a crankshaft of an engine through an input clutch to be driven by the engine and that has a plurality of drive gears mounted thereto; and a transmission output shaft or a countershaft to which a plurality of driven gears are mounted which are always engaged with the drive gears to form trains of speed change gears respectively, and a switchover sleeve of the dog clutch type that is driven by the operation of a shift pedal is provided in the transmission to select a train of speed change gears to transmit power. The manual type transmission is provided with an idler gear for reverse to back a vehicle which is engaged with a drive gear for reverse operation mounted to the main shaft and a driven gear for reverse mounted to the countershaft, and the idler gear is mounted to a reverse shaft that is arranged in a case housing therein the main shaft and the countershaft.

To prevent the idler gear mounted to the reverse shaft from slipping along the shaft direction, there is known a conventional method in which ring-shaped retention grooves are formed at the reverse shaft corresponding to both sides of the idler gear; and snap rings are mounted to the respective retention grooves to prevent the idler gear from slipping along the shaft direction. Furthermore, there is known a method disclosed in Japanese Patent Application Laid-Open Publication 10-259860 in which step portions along the diameter direction are formed on the reverse shaft corresponding to both sides of the idler gear and washers are mounted between the respective step portions and the idler gear to prevent the idler gear from slipping along the shaft direction.

However, in case of forming retention grooves for retaining two snap rings at the reverse shaft, there is required an assembling process of stretching the snap rings along the diameter direction and attaching thus stretched snap rings to the reverse shaft, which undesirably increase the number of parts as well as the number of manufacturing processes of the power transmission apparatus. Furthermore, use of washers requires cutting works for the reverse shaft to form two step portions corresponding to both sides of the idler gear. This results in increasing working processes for the reverse shaft is increased as well as in requiring two washers to be mounted to the reverse shaft, which undesirably increase the number of parts as well as the number of manufacturing processes of the power transmission apparatus accordingly.

SUMMARY OF THE INVENTION

It is therefore an object of the present invention to overcome the above-mentioned drawbacks by providing a power transmission apparatus for a vehicle whose idler gear for reverse and reverse shaft for supporting the idler gear can be assembled easily using a small number of parts.

A power transmission apparatus for a vehicle according to the present invention has a main shaft driven by an engine and a countershaft coupled to drive wheels, both of which are provided in parallel to each other and mounted to a case of the apparatus; and a plurality of trains of speed change gears comprised of a plurality of drive gears mounted to the main shaft and a plurality of driven gears mounted to the countershaft; and a switchover sleeve that sets one of the plural trains of speed change gears to be under power transmission state, said apparatus comprising: a reverse shaft which has an idler gear for reverse operation rotatably mounted thereto and is mounted to the case, the idler gear being engaged with a drive gear for reverse operation mounted to the main shaft and a driven gear for reverse operation mounted to the countershaft; a projection which is integrally formed on the reverse shaft and is in contact with one end surface of the idler gear to prevent the idler gear from slipping, and a ring-shaped member which is mounted to the reverse shaft and is in contact with the other end surface of the idler gear to prevent the idler gear from slipping.

The power transmission apparatus for a vehicle according to the present invention is characterized in that the ring-shaped member is a washer and the washer is mounted between the idler gear and the case.

According to the present invention, the reverse shaft that rotatably supports the idler gear for reverse operation has the projection integrally formed thereon being in contact with one end surface of the idler gear and the ring-shaped member mounted thereto being in contact with the other end surface of the idler gear. Accordingly, only mounting a single ring-shaped member to the reverse shaft, the idler gear is prevented from slipping along the shaft direction of the reverse shaft. Thus, the slip of the idler gear can be prevented by mounting the single ring-shaped member to the reverse shaft. So, in preventing the slip of the idler gear, it is not necessary to use a plurality of snap rings and washers, which can reduce the number of manufacturing processes as well as the number of parts, and can lower the manufacturing costs of the power transmission apparatus. When the ring-shaped member used as a washer is mounted between the case and the idler gear, it becomes unnecessary to form any step portion on the reverse shaft.

BRIEF DESCRIPTIONS OF THE DRAWINGS

DESCRIPTION OF THE PREFERRED EMBODIMENTS

Figure 1:
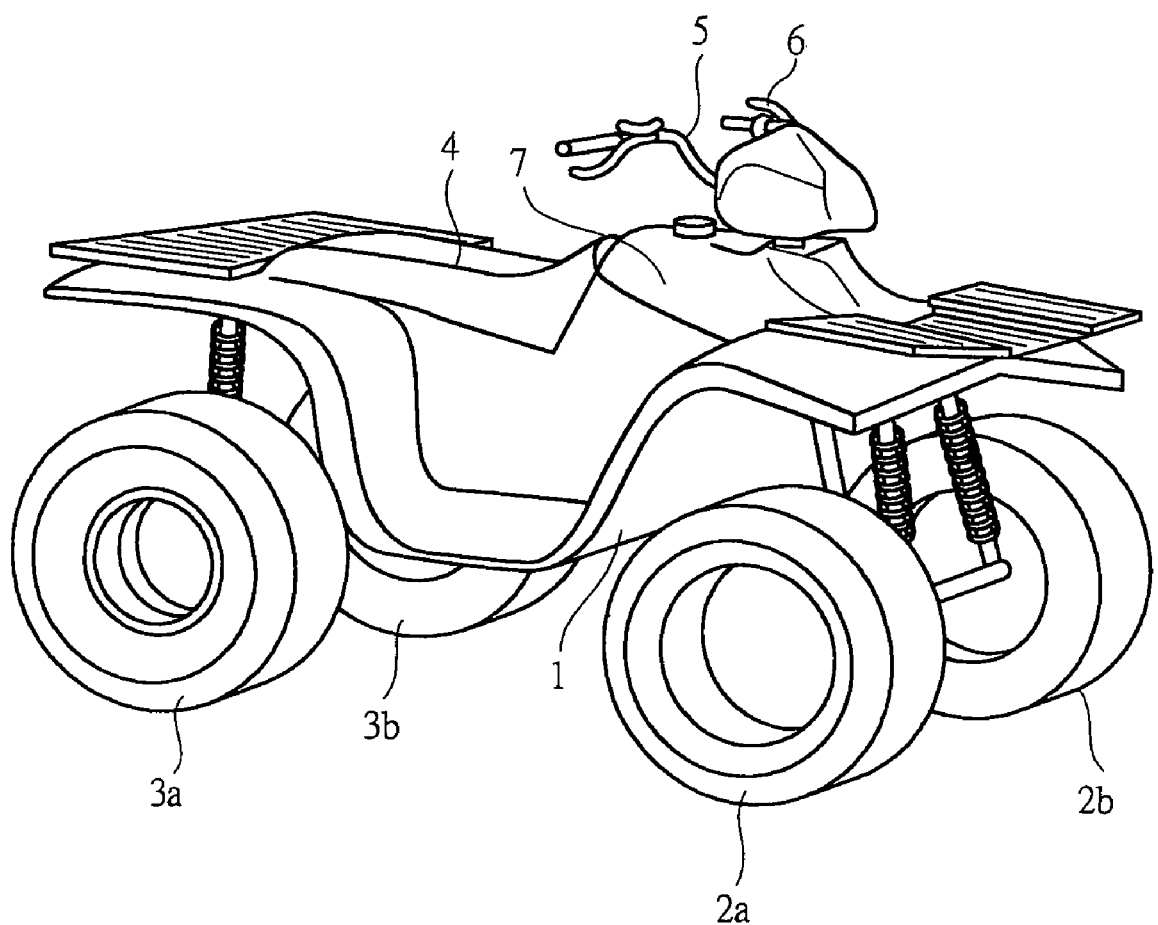
FIG. 1 shows a perspective view of a vehicle in which a power transmission apparatus is arranged.

The power transmission apparatus for a vehicle according to the present invention will further be described below with reference to the accompanying drawings. FIG. 1 shows a perspective view of a vehicle in which a power transmission apparatus is arranged. This vehicle is an ATV, which may be called a buggy, and runs on irregular grounds. As shown in FIG. 1, a body 1 has front wheels 2a, 2b and rear wheels 3a, 3b mounted thereto, and a saddle-type seat 4 is arranged at the center of the body 1. The driver straddles the seat 4 to ride on the vehicle, and operates a handle 5 to drive the vehicle.

Figure 2:
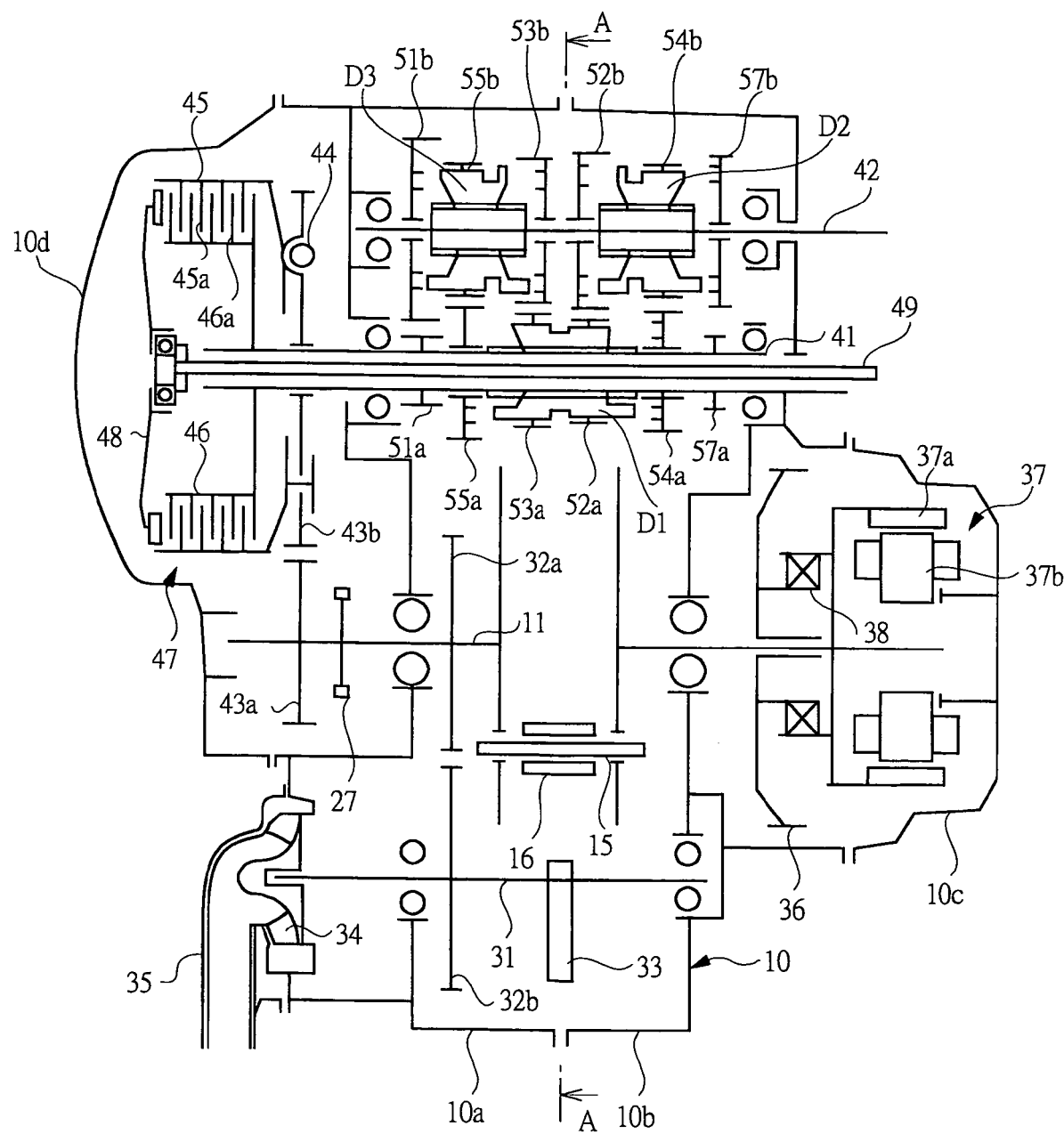
FIG. 2 shows a schematic view of the power transmission apparatus for a vehicle according to the present invention, which is arranged in the vehicle shown in FIG. 1.
Figure 3:
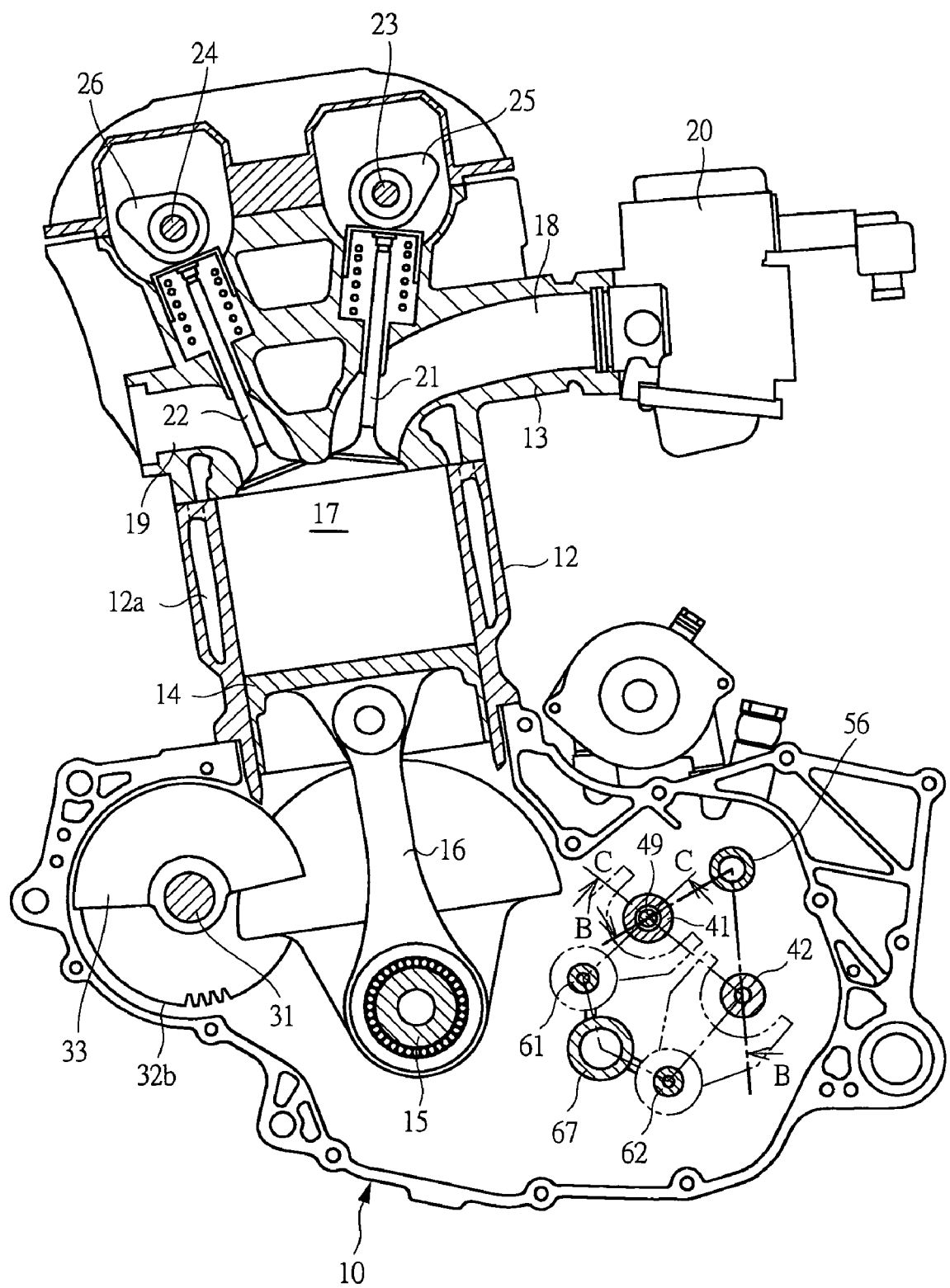
FIG. 3 shows a cross-sectional view along an A—A line shown in FIG. 2.

FIG. 2 shows a schematic view of the power transmission apparatus for a vehicle according to the present invention, which is arranged in the vehicle shown in FIG. 1, while FIG. 3 shows a cross-sectional view along an A—A line shown in FIG. 2. As shown in FIG. 2, in a crankcase 10, which is made up of two case-halves 10a and 10b, a crankshaft 11 is rotatably housed through bearings. As shown in FIG. 3, a cylinder 12 is attached to an opened portion formed at the upper side of the crankcase 10, and the cylinder 12 has a cylinder head 13 mounted thereto. The cylinder 12 has a reciprocating piston 14 arranged in the cylinder bore thereof, and a connecting rod 16 is coupled between a hollow crank pin 15, which is fixed to the crankshaft 11 at a position deviated from the rotational center thereof, and the piston 14, and the crankshaft 11 is driven to rotate by the piston 14. An engine having the cylinder 12 and the cylinder head 13 is a water-cooling type engine having a single cylinder.

The cylinder head 13 is provided with independently formed two sets of intake ports 18 and two sets of exhaust ports 19 which are directed to a combustion chamber 17, and has intake valves 21 for opening and closing the intake ports 18 and exhaust valves 22 for opening and closing the exhaust ports 19. The intake ports 18 are coupled to a carburetor 20 for generating mixture of air and fuel, and air-fuel mixture generated at the carburetor 20 is directed to the combustion chamber 17 through the intake ports 18. The engine is a four cycle engine. The cylinder head 13 has two camshafts 23, 24 for the intake valves 21 and the exhaust valves 22 rotatably mounted thereto respectively, and the camshaft 23 has valve operating cams 25 fixed thereto and the camshaft 24 has valve operating cams 26 fixed thereto. The valve operating cams 25, 26 are in contact with base ends of the camshafts 23, 24, respectively. The valve operating mechanism shown in FIG. 3 is of direct driven DOHC type. The valve operating mechanism may be of DOHC type or of SOHC type in which the intake valves 21 and the exhaust valves 22 are driven to open and close by valve operating cams through rocker arms. Since two sets of intake valves 21 and two sets of exhaust valves 22 corresponding to the two sets of intake ports 18 and the two sets of exhaust ports 19 are prepared for the respective camshafts 23, 24, the camshafts 23, 24 has fixed thereto two sets of valve operating cams 25, two sets of valve operating cams 26, respectively.

As shown in FIG. 2, the crankshaft 11 has a sprocket 27 fixed thereto, and timing chains, not shown, are engaged over the sprocket 27 and sprockets, not shown, fixed to the camshafts 23, 24, and the camshafts 23, 24 are driven to rotate in synchronization with rotation of the crankshaft 11.

As shown in FIG. 2, the crankcase 10 has a balancer shaft 31 rotatably mounted thereto, and the balancer shaft 31 has a gear 32b fixed thereto which is engaged with a gear 32a fixed to the crankshaft 11. Thus, the balancer shaft 31 is driven to rotate by the crankshaft 11 in synchronization therewith. The balancer shaft 31 is provided with a balance weight 33 for making the rotation of the crankshaft 11 smooth, as shown in FIG. 3. Furthermore, the balancer shaft 31 has a pump impeller 34 attached thereto, as shown in FIG. 2. The pump impeller 34 is arranged in a pump housing formed by part of the crankcase 10 and a pump cover 35 attached thereto to configure a water pump, and the water pump supplies engine cooling fluid to a water jacket 12a formed in the cylinder 12.

The crankshaft 11 has rotatably mounted thereto a starter gear 36, and has fixed thereto a rotor 37a having a permanent magnet which is arranged next to the starter gear 36, as shown in FIG. 2. The crankcase 10 has fixed thereto an electric power generation unit cover 10c which has a stator 37b having a coil mounted thereto. The rotor 37a and the stator 37b form an electric power generation unit 37. A one way clutch 38 built in between the rotor 37a and the starter gear 36, and the starter gear 36 is coupled to a gear of a starter motor, not shown. When starting the engine, turning force of the starter gear 36 that is driven to rotate by a starter motor is transmitted to the crankshaft 11 through the one way clutch 38. On the other hand, when the engine is being driven, turning force of the rotor 37a driven by the crankshaft 11 is prevented from being transmitted to the starter gear 36 by the one way clutch 38.

As shown in FIG. 2, the crankcase 10 has a hollow main shaft 41 working as a transmission input shaft and a countershaft 42 working as a transmission output shaft rotatably mounted thereto respectively provided in parallel to each other. The crankshaft 11 has fixed thereto a drive gear 43a that is engaged with a driven gear 43b rotatably mounted to the main shaft 41, and the driven gear 43b is coupled to a clutch drum 45 through a vibration-proof damper 44 built therein. On the other hand, the main shaft 41 has a clutch hub 46 fixed thereto, and a plurality of clutch discs 45a mounted to the inner surface of the clutch drum 45 and a plurality of clutch discs 46a mounted to the outer surface of the clutch hub 46 are arranged between the clutch hub 46 and the clutch drum 45. In this way, the clutch discs 45a and the clutch discs 46a configures an input clutch 47, and when the clutch discs 45a and the clutch discs 46a are engaged, turning force of the crankshaft 11 is transmitted to the main shaft 41 through the input clutch 47, while when not engaged or released, turning force of the crankshaft 11 is not transmitted to the main shaft 41. The crankcase 10 has a cover 10d mounted thereto for covering the input clutch 47.

In order to change the state of the input clutch 47 between the engagement state and the release state, the input clutch 47 is provided with an operating plate 48 to which force by a spring member, not shown, is applied to make the clutch discs 45a and the clutch discs 46a come into contact with each other. The main shaft 41 has a push rod 49 slidably housed along the shaft direction in the inner space thereof, and the push rod 49 is coupled to the operating plate 48 through a bearing. The push rod 49 is coupled to a clutch lever 6 of the handle 5 shown in FIG. 1 through a wire. When the clutch lever 6 is operated and the push rod 49 is moved to the left in FIG. 2, turning force of the crankshaft 11 is not transmitted to the main shaft 41, while when the clutch lever 6 is released, the input clutch 47 comes into the engagement state by the spring force.

The main shaft 41 has a drive gear 51a for low speed integrally mounted thereto, and drive gears 52a, 53a for second speed, third speed are respectively attached to a dog clutch D1 as a switchover sleeve, as shown in FIG. 2. The dog clutch D1 is engaged with a spline formed on the main shaft 41, and rotates together with the main shaft 41 and moves along the shaft direction thereof. Furthermore, the main shaft 41 has drive gears 54a, 55a for fourth speed, fifth speed rotatably mounted thereto at both sides of the dog clutch D1. On the other hand, the countershaft 42 has a driven gear 51b rotatably mounted thereto for low speed which is always engaged with the drive gear 51a to form a train of speed change gears, and driven gears 52b, 53b for second speed, third speed which are always engaged with the drive gears 52a, 53a to form trains of speed change gears respectively. The countershaft 42 is further provided with a dog clutch D2 that has attached thereto a driven gear 54b for fourth speed which is always engaged with a drive gear 54a to form a train of speed change gears, and a dog clutch D3 that has attached thereto a driven gear 55b for fifth speed which is always engaged with a drive gear 55a to form a train of speed change gears. The respective dog clutches D2, D3 configure switchover sleeves, and rotate together with the countershaft 42 and moves along the shaft direction thereof.

Figure 4:
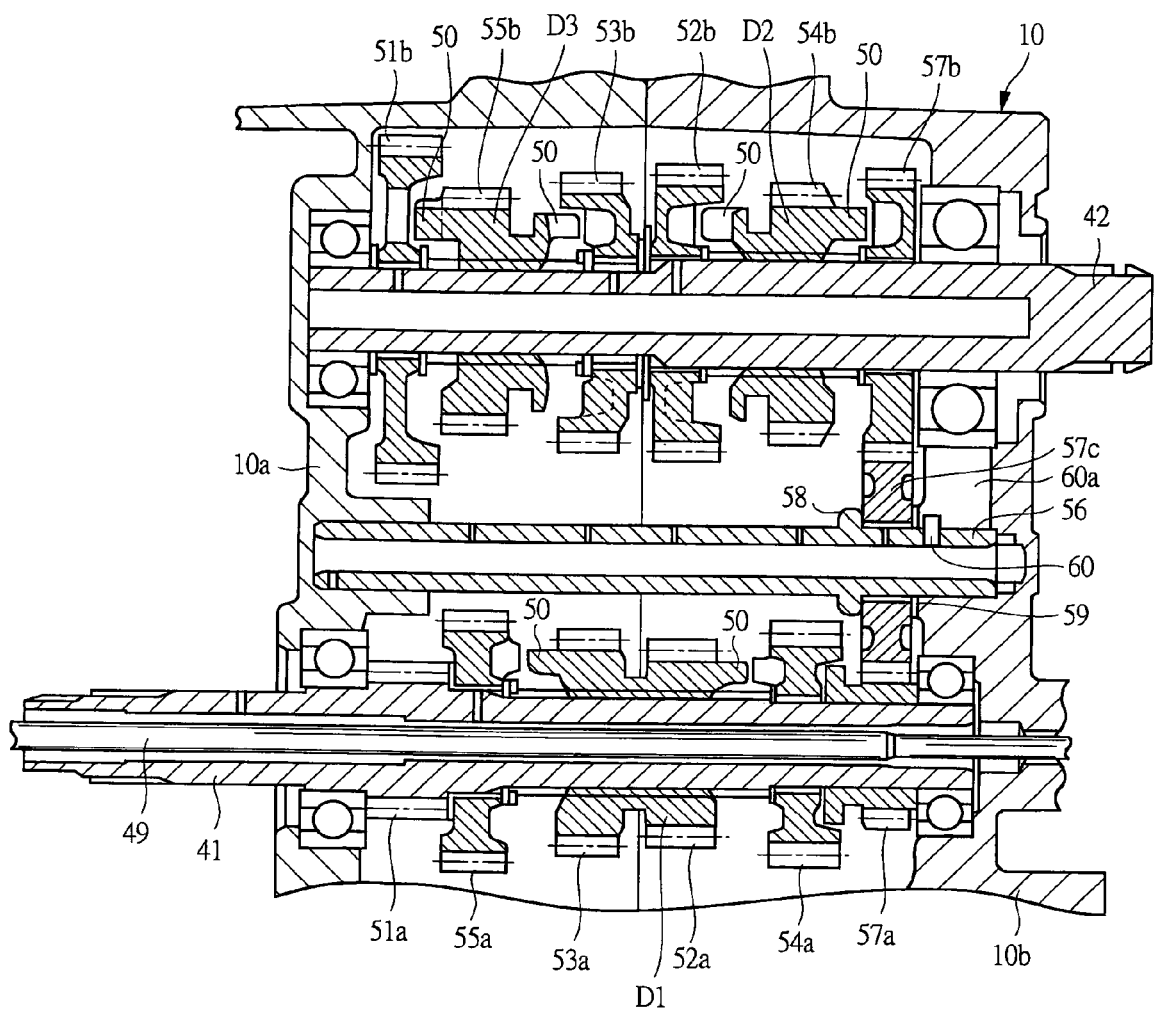
FIG. 4 shows a cross-sectional view of expanded cross-section along a B—B line shown in FIG. 3.
Figure 5:
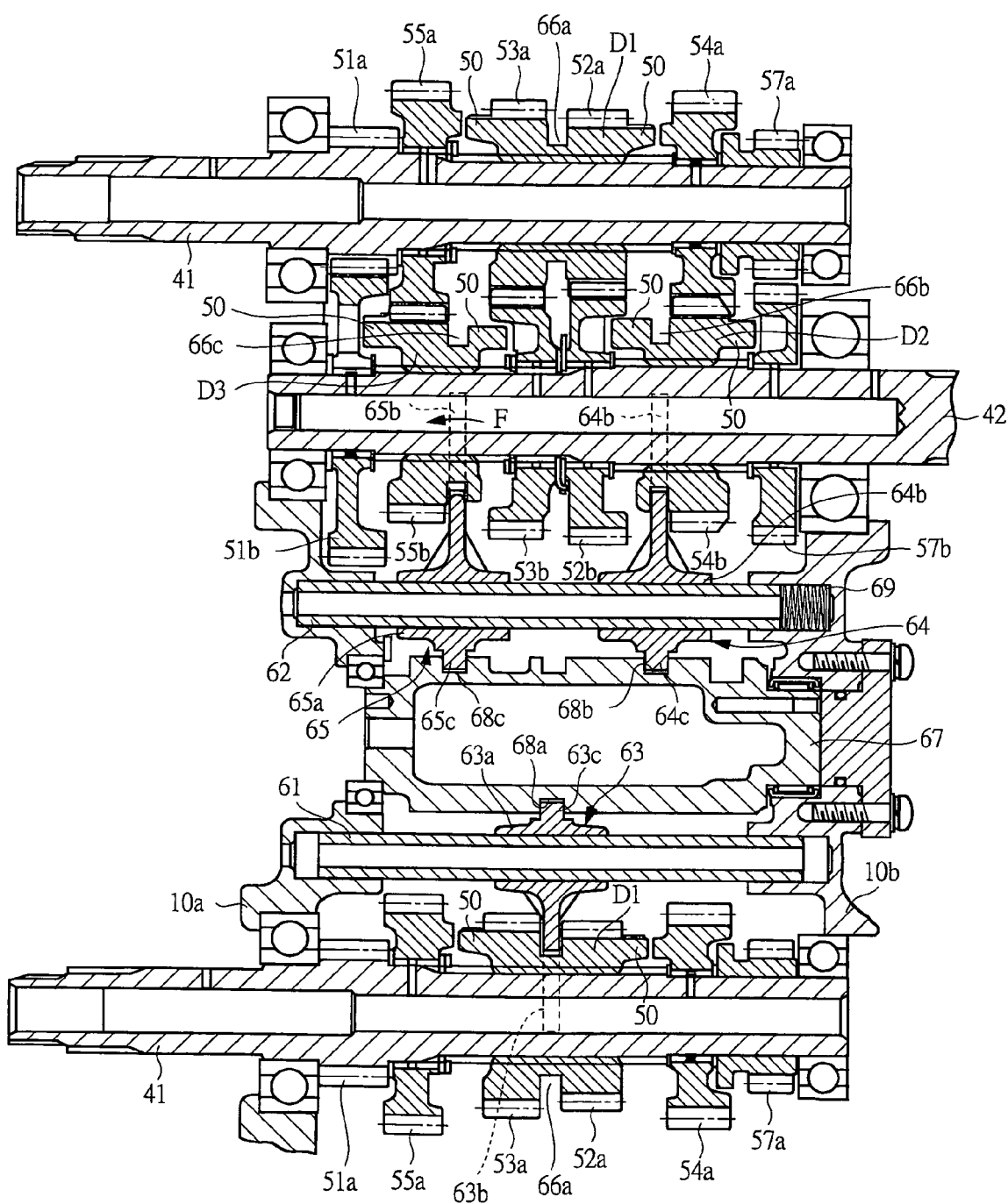
FIG. 5 shows a cross-sectional view of expanded cross-section along a C—C line shown in FIG. 3.

The dog clutches D1 to D3 are provided, on both sides thereof, with projections 50 along the circumferential direction with predetermined intervals arranged thereamong, as shown in FIG. 4 and FIG. 5. When the dog clutches D1 to D3 are moved along the shaft direction, and have their projections 50 engaged with recesses correspondingly formed at gears, thus engaged gears transmit turning force through their respective dog clutches D1 to D3. For example, when the dog clutch D3 is engaged with the driven gear 51b for low speed, since the driven gear 51b rotates together with the countershaft 42 due to the dog clutch D3, turning force of the main shaft 41 is transmitted to the countershaft 42 through a train of speed change gears for low speed. Similarly, when the dog clutch D1 is engaged with the drive gear 54a for fourth speed, turning force is transmitted through a train of speed change gears for fourth speed, while when the dog clutch D1 is engaged with the drive gear 55a for fifth speed, turning force is transmitted through a train of speed change gears for fifth speed.

FIG. 4 shows a cross-sectional view along a B—B line shown in FIG. 3, while FIG. 5 shows a cross-sectional view along a C—C line shown in FIG. 3. In FIG. 4, since the cross-section is expanded two-dimensionally, trains of speed change gears for low speed to fifth speed are shown to be separated. FIG. 5 also shows the cross-section in expanded state, and for the convenience of explanation, the main shaft 41 is reduplicated in one drawing.

As shown in FIG. 4, a reverse shaft 56 is attached to the crankcase 10, and an idler gear for reverse operation or a reverse idler gear 57c is fixed to the reverse shaft 56, and the reverse idler gear is always engaged with a drive gear 57a for reverse operation that is fixed to the main shaft 41 and rotates together and with a driven gear 57b for reverse operation that is rotatably mounted to the countershaft 42 to configure a train of speed change gears for reverse operation. The driven gear 57b for reverse operation is so designed as to be engaged with the dog clutch D2, and when they are engaged, rotational direction of turning force of the main shaft 41 is reversed by the reverse idler gear 57c, and thus rotational-direction-reversed turning force is transmitted to the countershaft 42.

The countershaft 42 is coupled to drive wheels or the front wheels 2a, 2b and the rear wheels 3a, 3b shown in FIG. 1 through power transmission members, not shown, such as chains, and engine power is transmitted to the respective drive wheels.

The reverse shaft 56 is formed of a hollow shaft whose inner space is provided with lubricant, and has holes formed at the cylindrical wall thereof for discharging lubricant to the gears. The reverse shaft 56 has an annular projection 58 integrally formed thereon to rotatably support the reverse idler gear 57c and prevent the reverse idler gear 57c from slipping along the shaft direction. Furthermore, as a partner member of the projection 58, the reverse shaft 56 has a washer 59 being a ring-shaped member mounted at the side of the base end thereof to prevent the slip of the reverse idler gear 57c along the shaft direction in cooperation with the annular projection 58. Being arranged between the reverse idler gear 57c and the crankcase 10, the washer 59 can be fixed to the reverse shaft 56 without forming a step portion on the reverse shaft 56. Thus, the reverse shaft 56, whose outer diameter is equalized as a whole along the longitudinal direction except the part of the projection 58, can be manufactured under a small number of manufacturing processes.

Since the reverse idler gear 57c is prevented from slipping along the shaft direction by the projection 58 integrally formed on the reverse shaft 56 in advance and the washer 59 mounted to the reverse shaft 56 at a position between the reverse idler gear 57c and the crankcase 10, a plurality of snap rings and washers are not required to prevent the slip of the reverse idler gear 57c, which can reduce the number of manufacturing processes as well as the number of parts, and can lower the manufacturing cost of the power transmission apparatus. The projection 58, shown in FIG. 4 as a single annular member projecting outward, may be made up of a plurality of projections formed along the circumferential direction with predetermined intervals arranged thereamong. Furthermore, the reverse shaft 56 has a pin 60 attached thereto, and the reverse shaft 56 is prevented from rotating by inserting the pin 60 into a slit 60a formed in the crankcase 10.

As shown in FIG. 5, the crankcase 10 has two hollow fork shafts 61, 62 mounted thereto. One fork shaft 61 has a shifting fork 63 slidably attached thereto along the shaft direction for driving the dog clutch D1, while the other fork shaft 62 has a shifting fork 64 for driving the dog clutch D2 and a shifting fork 65 for driving the dog clutch D3 both slidably attached to the fork shaft 62 along the shaft direction. The respective shifting forks 63 to 65 have bosses 63a, 64a and 65a which the fork shafts 61, 62 slidably fit into, and the bosses 63a to 65a have predetermined lengths along the shaft direction. The respective shifting forks 63 to 65 have forked engagement chips 63b, 64b and 65b, which are to be engaged with engagement grooves 66a, 66b and 66c formed in the dog clutches D1 to D3, and which are integrally formed on the bosses 63a to 65a, respectively. Between the inner surfaces of the bosses 63a to 65a of the shifting forks 63 to 65 and the outer surfaces of the fork shafts 61, 62, slight gaps are formed to make the shifting forks 63 to 65 smoothly slide along the fork shafts 61, 62.

In order to move the shifting forks 63 to 65 along the shaft direction to drive the dog clutches D1 to D3, the crankcase 10 has a cylindrical hollow shift drum 67 rotatably mounted thereto, as shown in FIG. 5. The shift drum 67 is coupled to a shift pedal, not shown, pivotally mounted to the body 1 through a transmission member such as a wire, and is driven to rotate by the operation of the shift pedal. There are formed on the outer surface of the shift drum 67a a cam groove 68a with which a cam 63c formed on the shifting fork 63 is engaged; a cam groove 68b with which a cam 64c formed on the shifting fork 64 is engaged; and a cam groove 68*c* with which a cam 65*c* formed on the shifting fork 65 is engaged, as shown in FIG. 5.

Figure 6:
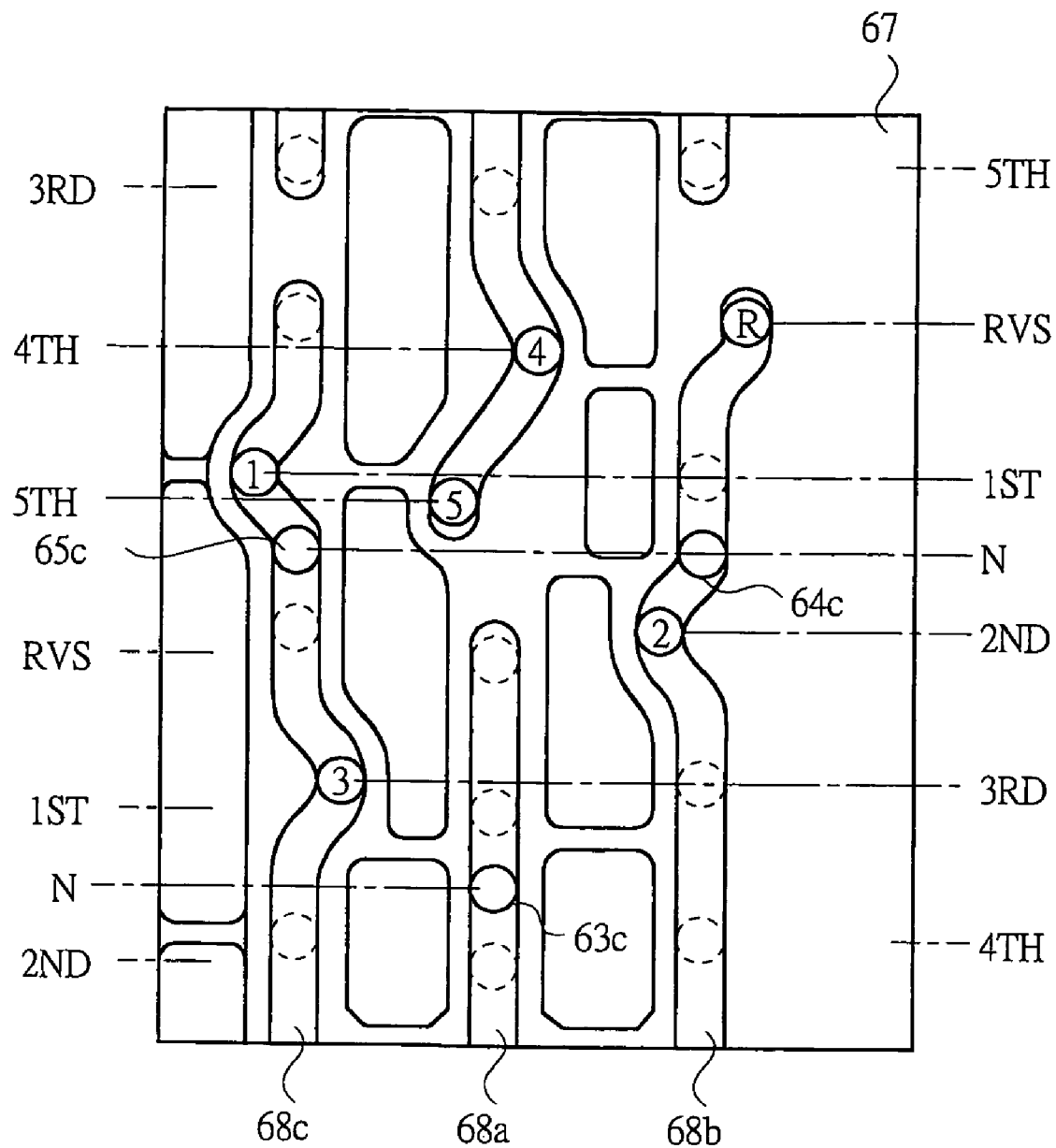
FIG. 6 shows an expanded view in which the outer surface of a shift drum is expanded two-dimensionally.

FIG. 6 shows an expanded view in which the outer surface of the shift drum 67 is expanded two-dimensionally. As shown in FIG. 6, the respective cam grooves 68*a* to 68*c* extend along the circumferential direction as well as has axially displaced portions. The cam groove 68*a*, with which the cam 63*c* of the shifting fork 63 is engaged, has a neutral position at which the dog clutch D1 is engaged with neither the drive gear 54*a* for fourth speed nor the drive gear 55*a* for fifth speed; a fourth speed position which is displaced to the drive gear 54*a* side from the neutral position; and a fifth speed position which is displaced to the drive gear 55*a* side from the neutral position. The fourth speed position and the fifth speed position are indicated by encircled numbers 4 and 5, respectively. The cam groove 68*b*, with which the cam 64*c* of the shifting fork 64 is engaged, has a neutral position at which the dog clutch D2 is engaged with neither the driven gear 52*b* for second speed nor the driven gear 57*b* for reverse operation, a second speed position which is displaced to the driven gear 52*b* side from the neutral position; and a reverse operation position which is displaced to the driven gear 57*b* side from the neutral position. The second speed position and the reverse operation position are indicated by an encircled number 2 and an encircled character R, respectively. The cam groove 68*c*, with which the cam 65*c* of the shifting fork 65 is engaged, has a neutral position at which the dog clutch D3 is engaged with neither the driven gear 51*b* for low speed nor the driven gear 53*b* for third speed; a low speed position which is displaced to the driven gear 51*b* side from the neutral position; and a third speed position which is displaced to the driven gear 53*b* side from the neutral position. The low speed position and the third speed position are indicated by encircled numbers 1 and 3, respectively. In FIG. 6, with respect to the cam grooves 68*a* to 68*c*, when one of the shifting forks is driven due to rotation of the shift drum 67, positions of cams 63*c* to 65*c* of other shifting forks which are at the same position as the neutral position are indicated by dotted circles.

When the shift drum 67 is rotated to a position for low speed, since the low speed position of the cam groove 68*c* comes to the cam 65*c* position of the shifting fork 65, the dog clutch D3 is engaged with the driven gear 51*b* and the transmission stage is set up for low speed. From this state, when the driver operates the shift pedal to set up the transmission stage from low speed to second speed, the shifting fork 65 is firstly restored to the neutral position and the dog clutch D3 comes to the neutral position. Then, the second speed position of the cam groove 68*b* comes to the cam 64*c* position of the shifting fork 64, and the dog clutch D2 is engaged with the driven gear 52*b*.

In this way, in order to change the power transmission state from the state in which the train of speed change gears for low speed are transmitting power to the state in which the train of speed change gears for second speed are transmitting power, the engagement between the dog clutch D3 and the driven gear 51*b* is released to restore the dog clutch D3 to the neutral position. At this time, power transmitted by the train of speed change gears for low speed is larger than that transmitted by the train of speed change gears for other speed. Thus, in case the shift pedal is operated under the state in which the driver does not operate the clutch lever 6 and the input clutch 47 is in the engagement state, when the shift drum 67 drives the shifting fork 65 to release the engagement between the dog clutch D3 and the driven gear 51*b*, the shifting fork 65 may be inclined along an arrow F shown in FIG. 5 due to the gap between the outer surface of the fork shaft 62 and the inner surface of the boss 65*a*. When the shifting fork 65 is inclined in this way, edges of both ends of the boss 65*a* undesirably get into the fork shaft 62, raising mechanically locked state. Thus, the sliding resistance of the shifting fork 65 undesirably becomes large, which prevents the shifting fork 65 from sliding smoothly along the fork shaft 62 and requires large power to operate the shift pedal.

So as to smoothly operate the shifting fork 65 with small power even though the sliding resistance of the shifting fork 65 becomes large, the fork shaft 62 is slidably provided along the shaft direction in the crankcase 10, and has a helical compression spring 69 coupled thereto, which is arranged between one end of the fork shaft 62 and the crankcase 10. Due to the spring force of the helical compression spring 69, thrust directed toward the train of speed change gears for low speed is being applied to the fork shaft 62. Thus, when thrust against the spring force is not applied to the fork shaft 62, the fork shaft 62 is being pressed toward the train of speed change gears for low speed. When the train of speed change gears for low speed transmits power, in case the engagement between the dog clutch D3 and the driven gear 51*b* is released with the input clutch 47 left in the engagement state and edges of both ends of the boss 65*a* get into the fork shaft 62, the fork shaft 62 itself moves to the side of the transmission stage for third speed against the spring force, so that the dog clutch D3 can be operated using small power even though the dog clutch D3 is restored to the neutral position with the input clutch 47 left in the engagement state. Due to this, under the state in which train of speed change gears for low speed are transmitting power, the dog clutch D3 easily comes to the neutral position to change the power transmission state into the state in which train of speed change gears for second speed are transmitting power without increasing power to operate the shift pedal.

This facilitated transmission operation can be realized in restoring the dog clutch D2 to the neutral position with the input clutch 47 left in the engagement state when the dog clutch D2 is engaged with the driven gear 52*b* and train of speed change gears for second speed are transmitting power. In this operation, since the shifting fork 64 that operates the dog clutch D2 is mounted to the fork shaft 62, even though mechanically locked state is raised between the shifting fork 64 and the fork shaft 62, since the fork shaft 62 moves to the side of the transmission stage for higher speed, the transmission operation becomes easy. On the other hand, in FIG. 5, the fork shaft fork shaft 61 may have its one end or left end coupled to a spring to apply spring force directed toward right or the side of the transmission stage for lower speed to the fork shaft 61.

While the invention has been described in accordance with certain preferred embodiments, it should be understood that the invention is not limited to the embodiments, but various modifications, alternative constructions or equivalents can be implemented without departing from the scope and spirit of the present invention. For example, the power transmission apparatus is used for not only all-ground type vehicles but also vehicles of other types. Instead of the washer 59 to prevent the slip of the reverse idler gear 57*c*, a snap ring may be used. In this case, a retention groove by which the snap ring is retained has to be formed on the reverse shaft 56. As a switchover sleeve, the dog clutch type is employed in above-described embodiments but a switchover sleeve of the synchromesh type may be employed.

The entire disclosure of Japanese Patent Application No. 2003-324968 filed on Sep. 17, 2003 including specification, claims, drawings and summary is incorporated herein by reference in its entirety.

What is claimed is:

1. A power transmission apparatus for a vehicle, which has a main shaft driven by an engine and a countershaft coupled to drive wheels, both of which are provided in parallel to each other and mounted to a case of the apparatus; and a plurality of trains of speed change gears comprised of a plurality of drive gears mounted to the main shaft and a plurality of driven gears mounted to the countershaft; and a switchover sleeve that sets one of the plural trains of speed change gears to be under power transmission state, said apparatus comprising:

a reverse shaft which has an idler gear for reverse operation rotatably mounted thereto and is mounted to the case, the idler gear being engaged with a drive gear for reverse operation mounted to the main shaft and a driven gear for reverse operation mounted to the countershaft;

a projection which is integrally formed on the reverse shaft and is in contact with one end surface of the idler gear to prevent the idler gear from slipping, and a ring-shaped member which is mounted to the reverse shaft and is in contact with the other end surface of the idler gear to prevent the idler gear from slipping.

2. The power transmission apparatus for a vehicle as set forth in claim 1, wherein the ring-shaped member is a washer, and the washer is mounted between the idler gear and the case.

* * * * *

UNITED STATES PATENT AND TRADEMARK OFFICE
CERTIFICATE OF CORRECTION

PATENT NO.        : 7,107,865 B2
APPLICATION NO.   : 10/941821
DATED             : September 19, 2006
INVENTOR(S)       : Kazushi Tomita et al.

It is certified that error appears in the above-identified patent and that said Letters Patent is hereby corrected as shown below:

Title Page, Item (73) Assignee please change the Assignee's name from "Masashi Seimitsu Industry Co., Ltd." to --Musashi Seimitsu Industry Co., Ltd.--.

Signed and Sealed this

Thirteenth Day of February, 2007

JON W. DUDAS
*Director of the United States Patent and Trademark Office*